(12) United States Patent
Tunstall et al.

(10) Patent No.: US 11,902,432 B2
(45) Date of Patent: Feb. 13, 2024

(54) SYSTEM AND METHOD TO OPTIMIZE GENERATION OF COPRIME NUMBERS IN CRYPTOGRAPHIC APPLICATIONS

(71) Applicant: Cryptography Research, Inc., San Jose, CA (US)

(72) Inventors: Michael Tunstall, Walnut Creek, CA (US); Michael Alexander Hamburg, San Francisco, CA (US); Qinglai Xiao, Espoo (FI)

(73) Assignee: Cryptography Research, Inc., San Jose, CA (US)

( * ) Notice: Subject to any disclaimer, the term of this patent is extended or adjusted under 35 U.S.C. 154(b) by 60 days.

(21) Appl. No.: 17/532,460

(22) Filed: Nov. 22, 2021

(65) Prior Publication Data

US 2022/0166614 A1 May 26, 2022

Related U.S. Application Data

(60) Provisional application No. 63/198,969, filed on Nov. 25, 2020.

(51) Int. Cl.
*G06F 21/00* (2013.01)
*H04L 9/08* (2006.01)
*G06F 7/02* (2006.01)

(52) U.S. Cl.
CPC .......... *H04L 9/0861* (2013.01); *G06F 7/02* (2013.01)

(58) Field of Classification Search
None
See application file for complete search history.

(56) References Cited

U.S. PATENT DOCUMENTS

| 2003/0044004 A1* | 3/2003 | Blakley | H04L 63/0428 380/28 |
| 2003/0163760 A1* | 8/2003 | Watanabe | G06F 7/729 714/10 |
| 2009/0119358 A1* | 5/2009 | North | G06F 7/723 708/491 |

(Continued)

OTHER PUBLICATIONS

Wang, Jiahao et al. PGMAP: A Privacy Guaranteed Mutual Authentication Protocol Conforming to EPC Class 1 Gen 2 Standards. 2008 IEEE International Conference on e-Business Engineering. https://ieeexplore.ieee.org/stamp/stamp.jsp?tp=&arnumber=4690628 (Year: 2008).*

(Continued)

*Primary Examiner* — Jeremiah L Avery
(74) *Attorney, Agent, or Firm* — LOWSENSTEIN SANDLER LLP

(57) ABSTRACT

Aspects of the present disclosure involve a method, a system and a computer readable memory to perform a cryptographic operation that includes identifying a first set of mutually coprime numbers, obtaining a second set of input numbers coprime with a corresponding one of the first set of mutually coprime numbers, obtaining an output number that is a weighted sum of the second set of input numbers, each of the second set of input numbers being taken with a weight comprising a product of all of the first set of mutually coprime numbers except the corresponding one of the first set of mutually coprime numbers, and performing the cryptographic operation using the output number.

20 Claims, 8 Drawing Sheets

(56) References Cited

U.S. PATENT DOCUMENTS

2015/0106616 A1* 4/2015 Nix .................. H04W 12/40
713/170
2016/0179473 A1* 6/2016 Bos .................. H04L 9/3249
380/28

OTHER PUBLICATIONS

Wang, Xinlei et al. STAMP: Enabling Privacy-Preserving Location Proofs for Mobile Users. IEEE/ACM Transactions on Networking, vol. 24, Issue: 6. https://ieeexplore.ieee.org/stamp/stamp.jsp?tp=&arnumber=7384753 (Year: 2016).*

Chaudhury, Punit et al. ACAFP: Asymmetric key based cryptographic algorithm using four prime numbers to secure message communication. A review on RSA algorithm. 2017 8th Annual IEMECON. https://ieeexplore.ieee.org/stamp/stamp.jsp?tp=&arnumber=8079618 (Year: 2017).*

Agarwala, Ashish; Saravanan, R. A Public Key Cryptosystem based on number theory. 2012 International Conference on Recent Advances in Computing and Software Systems. https://ieeexplore.ieee.org/stamp/stamp.jsp?tp=&arnumber=6212674 (Year: 2012).*

Joye, Marc et al., "Efficient Generation of Prime Numbers", Downloaded at: https://www.researchgate.net/publication/37442933_Efficient_Generation_of_Prime_Numbers , Springer-Verlag Berlin Heidelberg 2000, 15 pages.

Joye, Marc et al., "Fast Generation of Prime Numbers on Portable Devices: An Update" CHES (2006). 15 pages.

* cited by examiner

SYSTEM AND METHOD TO OPTIMIZE GENERATION OF COPRIME NUMBERS IN CRYPTOGRAPHIC APPLICATIONS

RELATED APPLICATIONS

This application claims the benefit of U.S. Provisional Application No. 63/198,969, filed Nov. 25, 2020, the entire contents of which is being incorporated herein by reference.

TECHNICAL FIELD

The disclosure pertains to cryptographic computing applications, more specifically to improving efficiency and security of cryptographic operations.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to improving efficiency and security of cryptographic operations. More specifically, aspects of the present disclosure are directed to optimization of processor and memory utilization during generation of coprime numbers in cryptographic applications.

Figure 1:
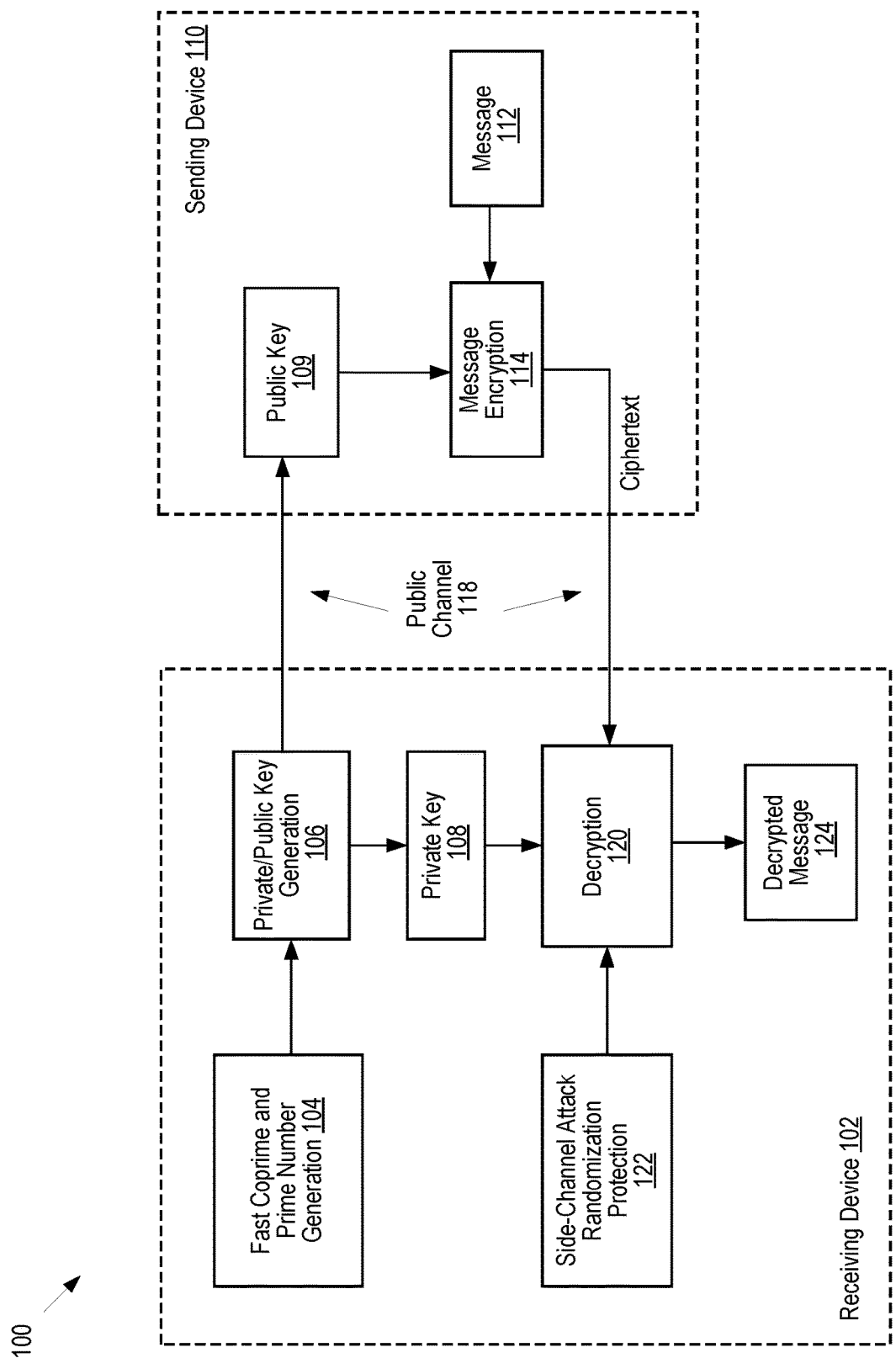
FIG. 1 illustrates an example network architecture in which various implementation of the present disclosure may operate.

FIG. 1 illustrates an example network architecture 100 in which various implementation of the present disclosure may operate. In public-key cryptography systems, computing devices may have various components/modules used for cryptographic operations on output or input messages. Computing devices may include a receiving device 102 that establishes a private key 108 and a public key 109 and provides the public key 109 to a sending device 110, which uses the public key 109 to encrypt message 112 before sending the encrypted message (ciphertext) to receiving device 102 over a public communication channel 118. Cryptographic algorithms often involve modular arithmetic operations with modulus N (mod N operations) in which the set of all integers Z is wrapped around a circle of length N (set $Z_N$), with any two numbers that differ by N (or by any integer multiple of N) treated as representing the same number (e.g., 16≡5 mod 11 and 122≡1 mod 11). Input messages used in such operations are often large binary numbers whose processing can be computationally expensive, in particular, when division operations are executed. Because cryptographic operations are often performed on devices having modest computational capabilities (e.g., microprocessors, smart card readers, wireless sensor nodes, etc.), it is advantageous to optimize utilization of hardware (e.g., processor and memory) resources in such operations.

Examples of cryptographic applications that employ asymmetric public key/private key cryptography include Diffie-Hellman (DH) key exchanges, digital signature algorithms (DSA) to authenticate transmitted messages, various elliptic curve cryptography schemes, Rivest-Shamir-Adelman (RSA) public key/private key applications, and the like. For example, a cryptographic application (of an intended recipient of an encoded message) may perform private/public key generation 106 by selecting two (or more) large prime numbers, e.g., p and q, adopting a public exponent e (often e=3, 17, or $2^{16}+1$) and computing a secret (decryption) exponent d based on the public (encryption) exponent e and the selected numbers p and q. The numbers e and N=p·q are revealed as part of the public key 109 whereas p, q, and d are stored in secret by the recipient as parts of the private key 108. A sender of message m (112) may convert (message encryption 114) the message into a ciphertext using modular exponentiation, c=$m^e$ mod N, and send the encrypted ciphertext cover the public communication channel 118. The recipient of the ciphertext may then decipher (message decryption 120) the ciphertext by applying another modular exponentiation, m=$c^d$ mod N, provided that the value of the decryption exponent d is selected is such a way that e·d=1 mod N*, where N*=(p−1)·(q−1) (Euler's totient function). Alternatively, as often used, N* may be taken as the least common multiplier of p−1 and q−1 (Carmichael's totient function). Because recovering the private exponent d requires factorizing a large public number N into its prime number multipliers p and q—a prohibitively heavy computational task for large N—the encrypted message m remains safe even if its ciphertext c becomes known to others.

Various cryptographic applications involve finding numbers that are mutually coprime (have no common divisors other than 1). For example, a public exponent in RSA-based applications has to be co-prime with N*. In some applications, generation of prime numbers (e.g., p and q) can begin with a simpler operation of selecting numbers that are coprime with a set of predefined prime numbers $\{p_i\}=p_1, p_2 \ldots p_M$ (e.g., the smallest M=50, 100, etc. prime numbers) and then looking for prime numbers among the selected coprime numbers. One possible method for finding numbers that are coprime to $\{p_i\}$ can take advantage of the Chinese Remainder Theorem (CRT). For example, by selecting a set of (non-zero) numbers $\{x_i\}$ in such a way that $x_i$ is coprime with the respective $p_i$, it is possible to determine number x modulo product $\Pi_M = \Pi_{i=1}^{M} p_i$ such that residues of x after division by $p_i$ are congruent to $x_i$: x≡$x_i$ mod $p_i$. Specifically, $$x = \sum_{i=1}^{M} x_i \theta_i \bmod \Pi_M, \quad \theta_i = \frac{\Pi_M}{p_i} \cdot \left(\left(\frac{\Pi_M}{p_i}\right)^{-1} \bmod p_i\right).$$

This identity can be verified by directly computing x mod $p_j$ and noting that for any number a, (a mod $\Pi_M$) mod $p_j$=a mod $p_j$. Because $\theta_i$ for all i≠j is divisible by $p_j$, all i≠j terms are zero mod $p_j$. The remaining i=j term gives (since by definition $\theta_j$ mod $p_j$=1)

x mod $p_j$=$x_j$ mod $p_j$.

Furthermore, since $x_j$ is coprime with prime $p_1$ (meaning that $x_j$ is not an integer of $p_j$), x mod $p_j$≠0. Accordingly, the number x constructed as described above is not divisible by any of the prime numbers {$p_1$} (x is coprime with the set {$p_i$}).

The above-described method requires computing and/or storing various values $\theta_i$ with the computation of each such value involving a division operation (finding the inverse $(\Pi_M/p_i)^{-1}$). Division operations can be computationally expensive whereas storing $\theta_i$ can consume valuable memory resources (especially in devices outfitted with low-power microprocessors and having limited memory).

Aspects and implementations of the present disclosure address the inefficiencies of computing and storing various intermediate quantities (e.g., $\theta_i$) during generation of coprime numbers by reducing computational (processing and memory) resources involved in such generation. Fast coprime and prime number generation 104 may be used for private/public key generation 106, decryption 120 of encrypted messages, and other cryptographic operations.

The Chinese Remainder Theorem approach identifies the mapping {$x_i$}→x that produces a number that has very specific properties (x≡$x_i$ mod $p_i$) which may provide little benefit in the context of coprime numbers identification. Cryptographic application may instead use mappings {$x_i$}→x disclosed herein that require fewer processing and memory resources while providing a similar (or better) benefit. The disclosed methods may result (based on randomly selected sets {$x_i$}) in uniformly random outputs x. Uniformly random outputs provide additional protection against power analysis attacks, such as simple power analysis (SPA) attacks, differential power analysis (DPA) attacks, and so on. A side-channel attacker intercepting hardware emissions may be less capable of acquiring additional information with each generation of prime or coprime numbers, if the respective outputs are random.

In some implementations, a mapping {$x_i$}→x may be performed using the formula, $$x = \sum_{i=1}^{M} x_i \frac{\Pi_M}{p_i} \bmod \Pi_M,$$

that does not require computation of inverse numbers and outputs x that is coprime with all values in the selected set {$p_i$}. For the same reason as described above in relation to the Chinese Remainder Theorem, only terms i=j contribute to x mod $p_j$:

$$x \bmod p_j = x_j \frac{\Pi_M}{p_i} \bmod p_j = x_j \cdot p_1 \cdot \ldots \cdot p_{j-1} \cdot p_{j+1} \cdot \ldots \cdot p_M \bmod p_j$$

Because all $p_{i \neq j}$ are coprime with $p_j$ and $x_j$ is coprime with $p_j$, none of the multipliers in the right-hand side of the last identity have common divisors with $p_j$, meaning that x mod $p_j$≠0. Accordingly, because x is not divisible by any of the factors $p_j$, the number x is coprime with each of these factors.

Figure 2:
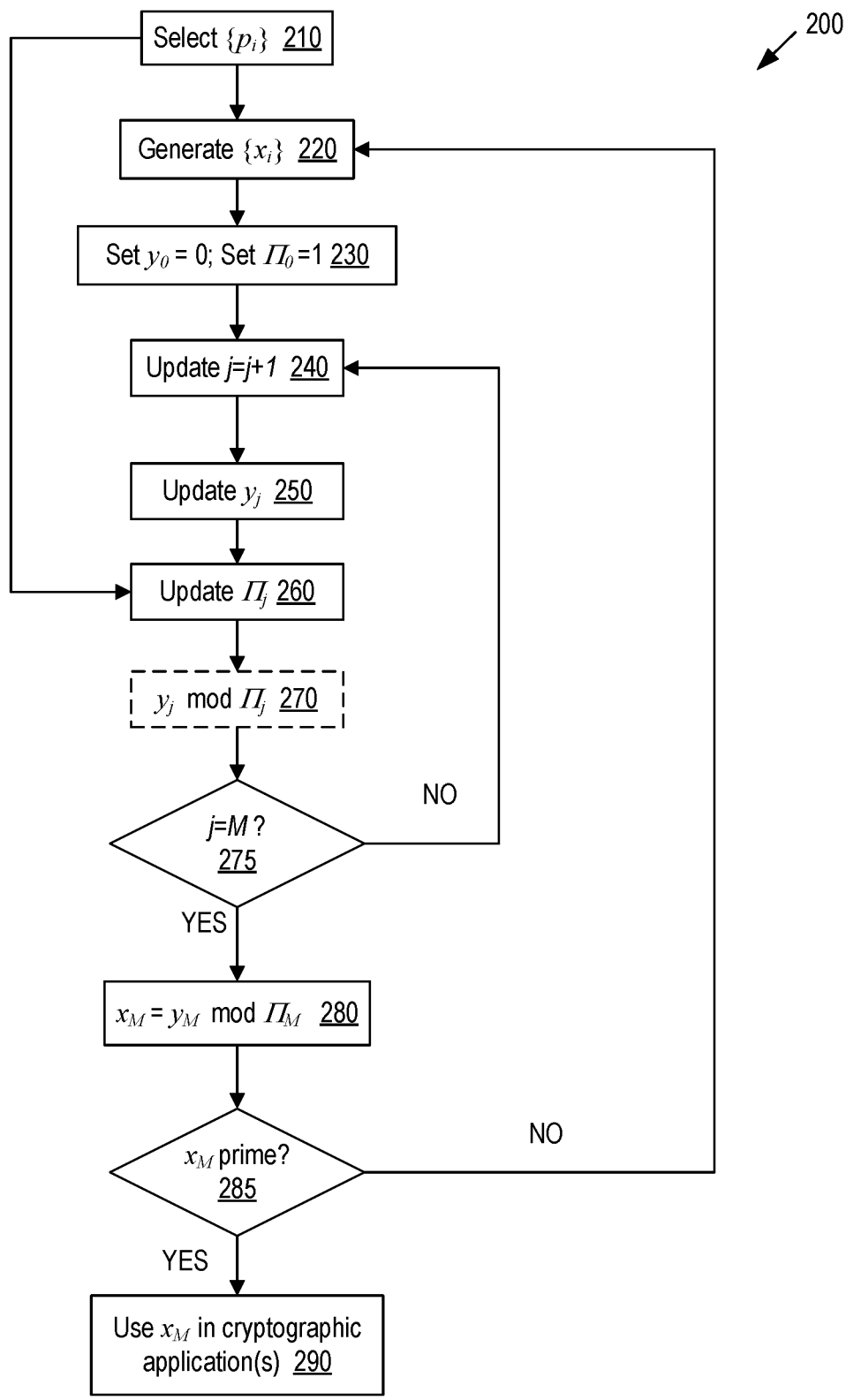
FIG. 2 depicts a flow diagram of an illustrative example of efficient generation of coprime numbers that avoids computation or storage of inverse values, in accordance with one or more aspects of the present disclosure.

FIG. 2 depicts a flow diagram of an illustrative example 200 of efficient generation of coprime numbers that avoids computation or storage of inverse values, in accordance with one or more aspects of the present disclosure. Efficient generation of coprime numbers may involve selection a set of {$p_i$} (block 210) and a set of {$x_i$} (block 220). In some implementations, to compute x, $$x = y_M \bmod \Pi_M, \quad y_M = \Pi_M \sum_{i=1}^{M} \frac{x_i}{p_i},$$

using an iterative (and memory-efficient) procedure describe below, a set of additional (intermediate) values $y_j$ may also be defined:

$$y_j = \Pi_j \sum_{i=1}^{j} \frac{x_i}{p_i}, \quad \Pi_j = \prod_{i=1}^{j} p_i.$$

A recurrence relation for $y_j$ follows from separation of the last (i=j) term:

$$y_j = \Pi_j \sum_{i=1}^{j-1} \frac{x}{p_i} + \Pi_j \frac{x_j}{p_j}$$

$$= p_j \Pi_{j-1} \sum_{i=1}^{j-1} \frac{x_i}{p_i} + \Pi_{j-1} x_j$$

$$= p_j y_{j-1} + \Pi_{j-1} x_j$$

In accordance with this recurrence formula, computation of $y_M$ may be performed using two memory registers: register R1 to store the running product value $\Pi_1$ and register R2 to store accumulator value $y_j$. Iterative computation of $y_M$ may then be performed as follows (blocks 230-280):

R1←$\Pi_0$=1; R2←$y_0$=0; (block 230)

R2←$y_j$=$p_j y_{j-1}$+$\Pi_{j-1} \cdot x_j$; R1→$\Pi_j$=$p_j \cdot \Pi_{j-1}$; (blocks 240-260)

After completion of M iterations of the algorithm (block 275), the accumulator value $y_M$ can be retrieved from register R2 and a modular division can be performed, x=$y_M$ mod $\Pi_M$ (block 280), to determine the number x coprime with $\Pi_M$. The determined number x can be used (block 290) in subsequent cryptographic computations, in various algorithms that identify whether a candidate number is a prime number, and so on.

In the implementation described above, mod $\Pi_M$ operation is performed after the completion of the iterative algorithms (block 280). In some implementations, modular operations can optionally be performed after (or in the course of) each iteration (block 270) indicated with the dashed outline. More specifically, after each iteration, the value stored in the accumulator register R2 can be $Y_j$=$y_j$ mod $\Pi_j$, while the set of the initial numbers $\{x_i\}$ can be similarly computed modulo respective number $p_j$:

$$X_j = x_j \bmod p_j.$$

The modular accumulator value may be computed as follows:

$$Y_j = p_j y_{j-1} + \Pi_{j-1} x_j \bmod \Pi_j.$$

Because $a \cdot b \bmod (p \cdot b) = b \cdot (a \bmod p)$ for any $a$ and $b$, the first term is $$p_j y_{j-1} \bmod \Pi_j = p_j y_{j-1} \bmod p_j \Pi_{j-1} = p_j (y_{j-1} \bmod \Pi_{j-1}) = p_j Y_{j-1}.$$

Similarly, the second term is $$\Pi_{j-1} x_j \bmod \Pi_j = \Pi_{j-1} x_j \bmod p_j \Pi_{j-1} = \Pi_{j-1} (x_j \bmod p_j) = \Pi_{j-1} X_j.$$

Accordingly, the recurrence formula can be written in terms of $Y_j$ and $X_j$ as, $$Y_j = p_j Y_{j-1} + \Pi_{j-1} X_j \bmod \Pi_j.$$

Because, by construction, $Y_{j-1} < \Pi_{j-1}$ and $X_j < p_j$, the sum $p_j Y_{j-1} + \Pi_{j-1} X_j < 2 \Pi_j$. As a result, mod $\Pi_1$ (operation performed at the end of each iteration) at most requires one subtraction of $\Pi_j$.

In some implementations, a coprime number can be generated using, $$x = \sum_{i=1}^{M} x_i \cdot \frac{\Pi_1}{p_i} \cdot a_i \bmod \Pi_2,$$

where $\Pi_1$ or $\Pi_2$ (or both) are different from the product HM $p_1 \cdot p_2 \cdot \ldots \cdot p_M$, and at least some $a_i \neq 1$. The output number is still coprime with all $\{p_i\}$ provided (in addition to $x_i$ being coprime with $p_i$) that 1) both $\Pi_1$ and $\Pi_2$ are divisible by each of the set $\{p_i\}$ and all additional (not included in the set $\{p_i\}$) divisors of $\Pi_1$ and $\Pi_2$ are coprime with each of $\{p_i\}$ (even though $\Pi_1$ can be different from $\Pi_2$), and 2) each $a_i$ is coprime with the respective $p_i$.

In some implementations, some or all of the numbers $\{p_i\}$ are not prime numbers. For the value $x_M = \Pi_M \Sigma_{i=1}^{M}(x_i/p_i)$ mod $\Pi_M$ to be coprime with each $p_i$ (as follows from the derivation above), it is sufficient to ensure only that 1) the preselected numbers $p_i$ are coprime with each other, and 2) each of the selected numbers $x_i$ is coprime with the respective number $p_i$. In some implementations, some or all numbers $x_i$ may be positive. In some implementations, some or all numbers $x_i$ may be negative. In some implementations, modular operations may be performed using Montgomery multiplication that replaces division by the modulus (e.g., $\Pi_M$ or $\Pi_1$) with a Montgomery reduction operation, which amounts to adding an appropriately chosen multiple of $\Pi_M$ or $\Pi_1$ until the result is a multiple of an auxiliary Montgomery modulus and thus amenable to a simple transformation (e.g., cancellation the low bits of the result).

Figure 3:
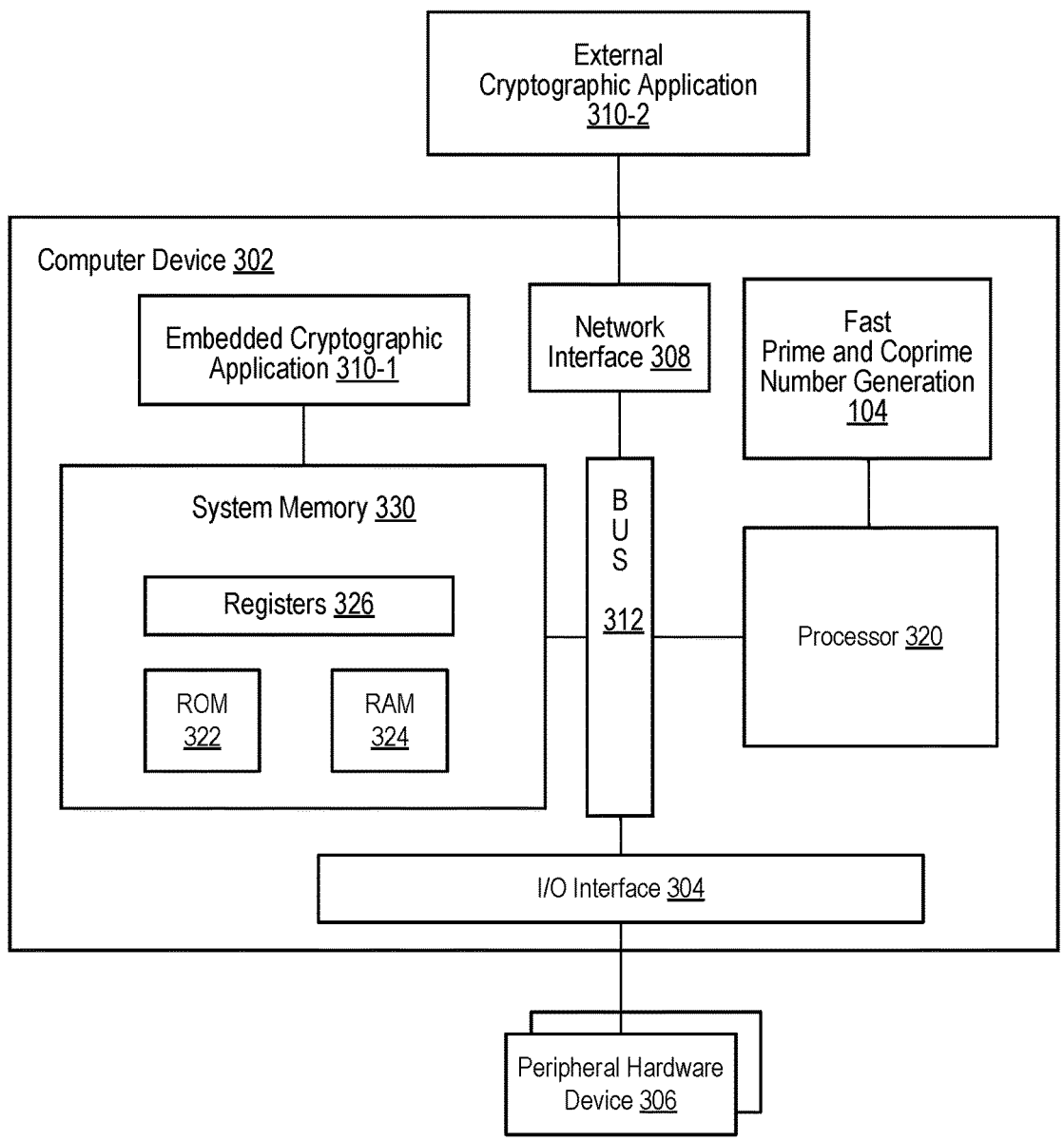
FIG. 3 is a block diagram illustrating an example computer system in which various implementations of the present disclosure may operate.

FIG. 3 is a block diagram illustrating an example computer system 300 in which various implementations of the present disclosure may operate. The example computer system 300 may be a desktop computer, a tablet, a smartphone, a server (local or remote), a thin/lean client, and the like. The example computer system 300 may be a smart a card reader, a wireless sensor node, an embedded system dedicated to one or more specific applications (e.g., cryptographic applications 310), and so on. The example computer system 300 may include, but not be limited to, a computer device 302 having one or more processors 320 (e.g., central processing units (CPUs)) capable of executing binary instructions, and one or more system memory 330 devices. "Processor" refers to a device capable of executing instructions encoding arithmetic, logical, or I/O operations. In one illustrative example, a processor may follow Von Neumann architectural model and may include an arithmetic logic unit (ALU), a control unit, and a plurality of registers. $\{p_i\}$ The computer device 302 may further include an input/output (I/O) interface 304 to facilitate connection of the computer device 302 to peripheral hardware devices 306 such as card readers, terminals, printers, scanners, internet-of-things devices, and the like. The computer device 302 may further include a network interface 308 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer device 302. Various hardware components of the computer device 302 may be connected via a bus 312 which may have its own logic circuits, e.g., a bus interface logic unit.

The computer device 302 may support one or more cryptographic applications 310, such as an embedded cryptographic application 310-1 and/or external cryptographic application 310-2. The cryptographic applications 310 may be secure authentication applications, encrypting applications, decrypting applications, secure storage applications, and so on. The external cryptographic application 310-2 may be instantiated on the same computer device 302, e.g., by an operating system executed by the processor 320 and residing in the system memory 330. Alternatively, the external cryptographic application 310-2 may be instantiated by a guest operating system supported by a virtual machine monitor (hypervisor) executed by the processor 320. In some implementations, the external cryptographic application 310-2 may reside on a remote access client device or a remote server (not shown), with the computer device 302 providing cryptographic support for the client device and/or the remote server.

The processor 320 may include one or more processor cores having access to a single or multi-level cache and one or more hardware registers. In implementations, each processor core may execute instructions to run a number of hardware threads, also known as logical processors. Various logical processors (or processor cores) may be assigned to one or more cryptographic applications 310, although more than one processor core (or a logical processor) may be assigned to a single cryptographic application for parallel processing. A multi-core processor 320 may simultaneously execute multiple instructions. A single core processor 320 may typically execute one instruction at a time (or process a single pipeline of instructions). The processor 320 may be implemented as a single integrated circuit, two or more integrated circuits, or may be a component of a multi-chip module.

The system memory 330 may refer to a volatile or non-volatile memory and may include a read-only memory (ROM) 322, a random-access memory (RAM) 324, as well as (not shown) electrically erasable programmable read-only memory (EEPROM), flash memory, flip-flop memory, or any other device capable of storing data. The RAM 324 may be a dynamic random-access memory (DRAM), synchronous DRAM (SDRAM), a static memory, such as static random-access memory (SRAM), and the like.

The system memory 330 may include one or more registers 326 to store cryptographic keys, prime and coprime numbers (e.g., $\{p_j\}$, $\{x_i\}$, etc.), intermediate values during coprime number generation (e.g., $\{y_1\}$, $\{\Pi_i\}$, etc.), and the like. In some implementations, registers 326 may be implemented as part of RAM 324. In some implementations, some or all of registers 326 may be implemented separately from RAM 324. Some or all of registers 326 may be implemented as part of the hardware registers of the processor 320. In some implementations, the processor 320 and the system memory 330 may be implemented as a single field-programmable gate array (FPGA).

The computer device 302 may include a fast coprime and prime number generation 104 module to assist in key generation (and other cryptographic application) for optimization of use of processor 320 and system memory 330 resources during message decryption, in accordance with implementations of the present disclosure. The fast coprime and prime number generation 104 may be implemented in software, hardware (e.g., as part of the processor 320), firmware, or in any combination thereof. In some implementations, the fast prime number generation 104 may access the contents of registers 326 to retrieve and store data used and generated during respective operations.

In some implementations, generated coprime numbers $x_M$ may be used in cryptographic applications (e.g., block 290 in FIG. 2) to generate prime numbers (e.g., for subsequent use in public/private key exchanges). In some implementations, generation of candidate prime numbers (for subsequent primality verification, e.g., in block 285 in FIG. 2) may involve employing polynomial functions, as described below. The polynomial functions may be operating on input numbers classified by their residue (e.g., quadratic residue) properties. A quadratic residue R modulo a number P is a number that is congruent to (different by a multiple of P from) a square of some number R: $R=Q^2$ mod P. Conversely, a quadratic nonresidue (QNR) N modulo P is a number that is not congruent, $N \neq X^2$ mod P to a square of any number X. Accordingly, selecting a number $-u$ such that $-u \neq X^2$ mod P (QNR modulo P) for any number X enables to construct the quadratic polynomial $X^2+u$ whose value for any number X is not divisible by P (since by construction $X^2+u \neq 0$ mod P).

Figure 4:
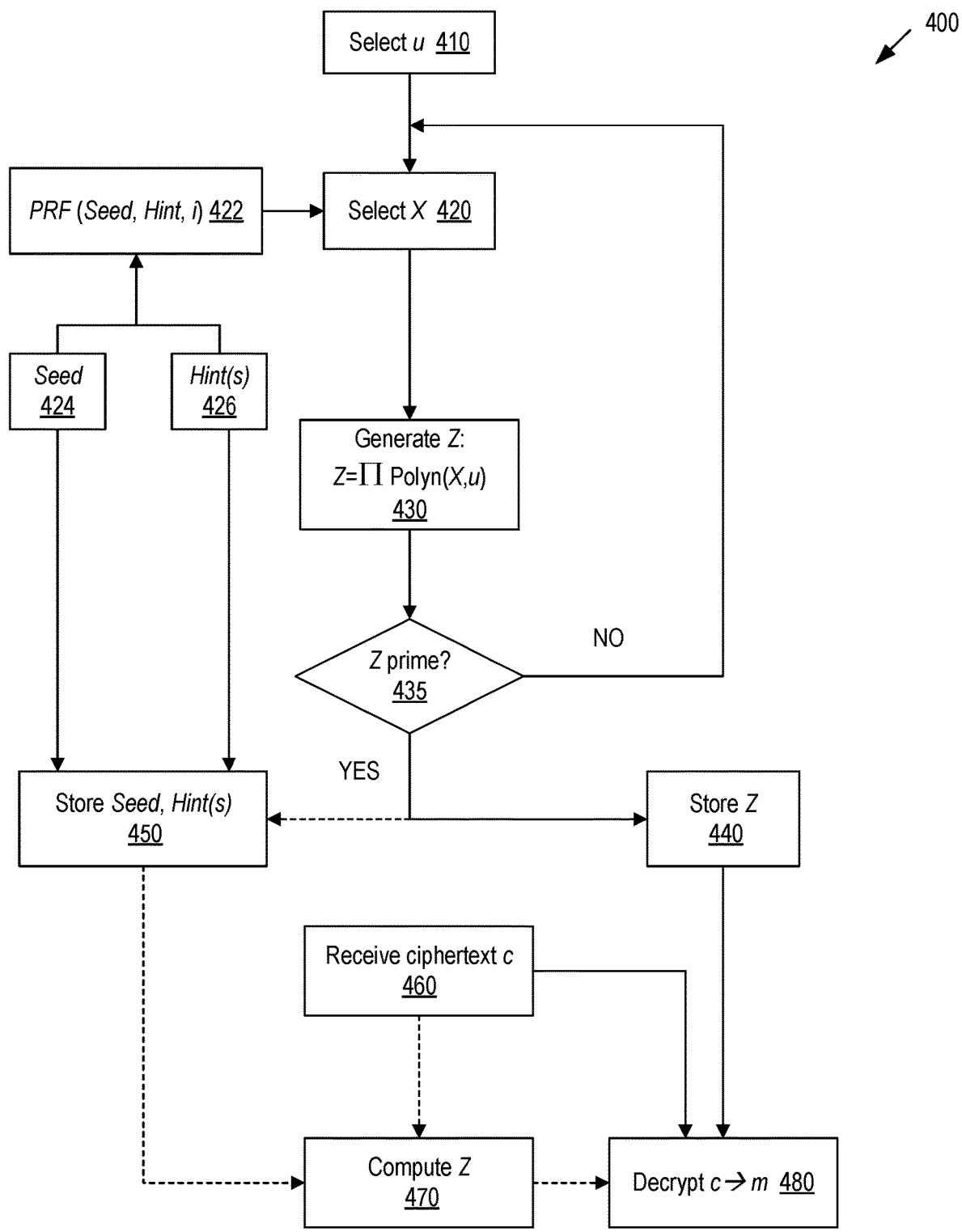
FIG. 4 depicts schematically an example sequence of operations during efficient generation of prime numbers and use of the generated prime numbers in cryptographic application, in accordance with one or more aspects of the present disclosure.

FIG. 4 depicts schematically an example sequence of operations 400 during efficient generation of prime numbers and use of the generated prime numbers in cryptographic application, in accordance with one or more aspects of the present disclosure. For a set of prime numbers $\{p_i\}$, selecting a number u (block 410) such that $u \neq X^2$ mod $p_i$ for any number X and for all numbers $p_i$ of the set $\{p_i\}$ ensures that the polynomial $X^2-u$ is not divisible by any number $p_i$ of the set $\{p_i\}$. Based on this property, in some implementations, the set of numbers $\{p_i\}$ may be chosen to include some (or all) prime numbers up to a target number (e.g., the first 50 prime numbers, the first 100 prime numbers, and so on): $\{P_i\}=3, 5, 7, 11, 13, 17, 19, 23 \ldots$. In some implementations, the set of numbers $\{p_i\}$ may be different from the first m prime numbers, as some prime numbers (e.g., 2, in this example) may be excluded while some additional (e.g., larger prime) numbers may be included, and so on. Therefore, selecting an arbitrary number X modulo HM ensures that the number $F(X)=X^2-u$ is not divisible by any of $p_i$. This increases the likelihood that the number $F(X)=X^2-u$ a prime number, compared with a random selection of potential candidates. The use of one or more such polynomials, therefore, speeds up successful prime number generation. Other polynomials may be used for generation of candidate numbers (herein also, "candidates"). For example, since by construction, for all X it holds that $u \neq X^{-2}$ mod $p_i$, the polynomial $G(X)=u \cdot X^2-1$ is likewise not divisible by any of $p_i$. Therefore, the polynomial function G (X) can be used in place of the function F(X) (or together with the function F(X), as explained in more detail below). Compared with the function F(X), the polynomial function G(X) includes one additional multiplication, which in many instances may be an acceptable increase of the involved computational time. Other polynomials can be used as well, e.g., polynomials that have no roots modulo any $p_i$ of the set $\{p_i\}$, e.g., a general quadratic polynomial $G(X)=s \cdot X^2+t \cdot X+u$ provided that $s \cdot X^2+t \cdot X-u \neq 0$ mod $p_i$ for any X, which upon multiplication by 4s and rearrangement in the form $(2s \cdot X+t)^2-t^2-4s \cdot u \neq 0$ mod $p_i$, requires that the number $t^2+4s \cdot u$ is QNR for all $p_i$.

In some implementations, at block 420, a set of numbers (e.g., random numbers) $\{X_j\}$ may be generated (e.g., uniformly within the range of X) instead of a single value X. The candidate number may be generated (at block 430) using a product of n instances (the n-product) of the polynomials:

$$Z = \prod_{j=1}^{n}(X_j^2 - u) \bmod \Pi_M, \text{ or}$$

$$Z = \prod_{j=1}^{n}(u \cdot X_j^2 - 1) \bmod \Pi_M.$$

With increasing n, the degree of uniformity of the candidate outputs Z increases. For a product of n=5 polynomials, the degree of uniformity is characterized by losses of approximately 0.055 bits of entropy for each generated prime number, or approximately 0.11 bits of for each pair of cryptographic primes p and q. With the further increase of the number of polynomial instances n, additional incremental improvements in uniformity may be achieved, but in many cryptographic applications it may be sufficient (for adequate protection against side-channel attacks) to implements n=5 or n=6 instances of polynomial functions. For increased uniformity (and protection), any higher number n>6 may be used. The enhanced uniformity of outputs may be weighed against increased amount of computations associated with additional multiplications and operations used to generate additional $X_j$. In some implementations, any other polynomials G(x), H(x), and the like, may be used in the product of the polynomials. In some implementations, all polynomial instances j may involve the same polynomial function. In some implementations, some polynomial instances, e.g., j=1, 2, 3, may involve a first kind of a polynomial (e.g., F(x)) whereas other polynomial instances, e.g., j=4, 5, 6, may involve a second kind of a polynomial (e.g., G(x)).

Operations that are performed to generate a candidate number (for a given number of polynomial instances n) include 2n−1 multiplications and n additions when polynomials F(x) are used, or 3n−1 multiplications and n additions when polynomials G(x) are used. When a computed candidate number Z is an even number, an odd number may be added before the primality testing is performed, for example, added may be M or any other predetermined number. In some implementations, the n-product may be modified to output an odd number, e.g., using a modulo 2M arithmetic operation:

$$Z = \prod_{j=1}^{n}\left(2\cdot\left(X_j^2+u\right)+M\right) \bmod 2M, \text{ or}$$

$$Z = \prod_{j=1}^{n}\left(2\cdot\left(X_j^2\cdot u+1\right)+M\right) \bmod 2M.$$

Other variations of these expressions may be used to ensure that the candidate Z is a number that is both odd and 2 mod 3 (a number 1 less than a multiple of 3), which may be useful when the public exponent e=3. Similarly, it may be ensured that the candidate Z is 3 mod 4 (a number 1 less than a multiple of 4), or that Z is k mod n, e.g., $$Z = \prod_{i=1}^{n}\left(n\cdot\left(X_i^2+n\right)+\left(k\cdot M^{-1}\bmod N\right)M\right)\bmod nM.$$

As should be recognized by a person skilled in this technology, numerous other similar polynomial product-based expressions can be used to generate prime number candidates that satisfy various additional target conditions, by adjusting the form of the polynomials or the modular operations.

When a computed candidate number Z is determined not to be a prime number (block 435), a different set of input numbers $\{X_i\}$ may be selected and another n-product of polynomials may be computed, as indicated by the NO-loop in FIG. 4. Alternatively, in some implementations, one or more additional numbers $X_{n+1}, X_{n+2} \ldots$ may be generated and the new candidate number Z* obtained according to $$Z^* = Z\cdot(X_{n+1}^2+u)\cdot(X_{n+2}^2+u)\cdot \ldots \bmod M.$$

Primality testing may be performed using any available test, such as the Pocklington test, the Baillie-PSW test, the Miller-Rabin test, or the like.

In some implementations, depending on the desired size of the prime numbers, a lower bound L may be set for the target range of Z. In some implementations, the lower bound may be a soft bound, with the candidate numbers that are below (but not significantly below) the lower bound deemed acceptable. Similarly, in some implementations, the candidate numbers that are above (but not significantly above) the lower bound may still be excluded. In one illustrative example, after the candidate number Z is determined, a modified candidate number $Z_L$ may be computed as follows:

$$Z_L = L + (Z - L \bmod M),$$

ensuring that $Z_L \in [L, M+L-1]$. In some implementations, L may be comparable to M (e.g., by an order of magnitude). In some implementations, L can be a multiple of M, pushing the interval [L, M+L-1] to values that are outside (and do not overlap with) the interval [0, M-1]. In some implementations, a larger range can be obtained by taking L to be a random multiple of M: L=R M where a random number R may be taken within a predefined interval corresponding to a desired (target) range of prime numbers. In some implementations, the random number R can be selected once for a particular instance of the prime number being generated and reused for all attempts to obtain this prime number (with other random numbers R selected when additional prime numbers are sought). In some implementations, the random number R can be resampled for each attempt (e.g., each application of the n-product) to obtain the prime number.

In some implementations, to generate (block 410) one or more numbers u that are QNR modulo each of a set of numbers $\{p_i\}$ (which may be a set of prime numbers or any set of mutually coprime numbers) a set of numbers $\{u_1\}$ may be selected, such that each number $u_i$ is QNR with respect to the corresponding number $p_i$ of the set $\{p_i\}$. The number u computed as the sum, $$u = \sum_{i=1}^{M} u_i \left(\frac{\Pi_M}{p_i}\right)^2 \bmod \Pi_M.$$

is QNR with respect to each number of the set $\{p_i\}$. This can be verified by computing u mod $p_j$ and noting that only the i=j term contributes to the result:

$$u \bmod p_j = u_j\left(\frac{\Pi_M}{p_j}\right)^2 \bmod p_j = (u_j \bmod p_j)\cdot\left(\left(\frac{\Pi_M}{p_j}\right)^2 \bmod p_j\right)\bmod p_j.$$

Because the second factor, $(\Pi_M/p_j)^2 \bmod p_j$, is nonzero quadratic residue mod $p_j$, whereas $u_j \bmod p_j$ is, by way of definition (selection), a quadratic non-residue mod $p_j$ ($u_j \neq R^2 \bmod p_j$ for any number R), it follows that the number u is QNR modulo any number of the set $\{p_i\}$. Accordingly, number u that is obtained via the mapping $\{u_1\} \rightarrow u$, may be used for generation of candidate prime numbers using any one of the polynomial functions disclosed above (or any similar function), e.g., $Z = \Pi_{j=1}^{n}(X_j^2 - u) \bmod \Pi_M$.

In some implementations, the method disclosed above may be extended to generating one or more numbers u that are k-th power non-residues modulo each number of the set $\{p_i\}$. A number u is k-th power non-residue mod $p_j$ provided that $u \neq R^k \bmod p_j$ for any choice of number R. A number that is a k-th power non-residues modulo each number of the set $\{p_i\}$ (which may be a set of prime numbers or any set of mutually coprime numbers) may be obtained by first selecting a set of numbers $\{u_i\}$ such that each number $u_i$ is k-th power non-residue modulo the corresponding number $p_i$. The number u is then computed as the sum, $$u = \sum_{i=1}^{M} u_i \left(\frac{\Pi_M}{p_i}\right)^k \bmod \Pi_M.$$

Verification that the number u is k-th power non-residue modulo each number of the set $\{p_i\}$ may be performed analogously to the proof presented above for the case of k=2.

In some implementations, computation of the number u may be performed iteratively (for either k=2 or k>2), by storing running value $(\Pi_j)^k = \Pi_{i=1}^{j}(p_i)^k$ in register R1 and the accumulator value $v_j = \Sigma_{i=1}^{j} u_i(\Pi_1/p_i)^k$ in register R2. Iterative computation of $u = v_M$ may be performed as follows:

$$R1 \leftarrow (\Pi_0)^k = 1; R2 \leftarrow v_0 = 0;$$

$$R2 \leftarrow v_j = (p_j)^k \cdot v_{j-1} + (\Pi_{j-1})^k \cdot u_j; R1 \leftarrow (\Pi_j)^k = (p_j)^k \cdot (\hbar_{j-1})^k$$

After completion of M iterations, the accumulator value $u = v_M$ can be retrieved from register R2 and used for generation of a prime number candidate as disclosed above. In some implementations, iterations of the algorithm can be modular operations. For example, operations of the j-th iteration can be mod $\Pi_j$ operations.

In some implementations, some or all numbers $u_i$ may be positive. In some implementations, some or all numbers $u_i$ may be negative. In some implementations, modular operations may be performed using Montgomery multiplication that replaces division by the modulus (e.g., M) with a Montgomery reduction operation, which amounts to adding an appropriately chosen multiple of M until the result is a multiple of an auxiliary Montgomery modulus and thus amenable to a simple transformation (e.g., cancellation the low bits of the result).

In some implementations, generation of the set of numbers $\{X_j\}$ may be performed using one or more pseudorandom functions (PRF), e.g., a function which generates outputs deterministically (so that the same inputs generate the same inputs), while the outputs appear similar to random numbers (block 422). A PRF may use a seed number Seed (block 424), an identifier j (e.g., enumerator) of the number $X_j$ being generated and a hint Hint (block 426) that may change (deterministically or randomly) between different attempts (applications of the n-product) in generating the prime number:

$$X_j = \text{PRF}(\text{Seed}, j, \text{Hint}).$$

In some implementations, Seed may be a longer number (e.g., a 128-bit number, a 256-bit number, and the like), whereas Hint may be a shorter number (e.g., a 16-bit number, a 32-bit number, and the like). The inputs Seed and Hint may be stored as a secret information and may be protected, during execution of PRF( ) using various methods of blinding, masking, or other types of cryptographic protection.

In some implementations, Seed may be generated randomly (e.g., as part of side-channel attack randomization protection 122 of FIG. 1), for each prime number generating session, for each particular time period, every time the processing device is powered on, and so on. Seed may be generated from a hardware key, such as a PUF (physical unclonable function) key that is based on manufacturing characteristics of a hardware device. Upon a successful prime number identification using the methods disclosed above, as depicted by dashed arrows in FIG. 4, at block 450, the processing device may store Seed and Hint (and, optionally, if one or more additional numbers $X_{n+1}, X_{n+2} \ldots$ were employed—the total number $j_{max}$ of the numbers X used in the n-product) whereas the actual generated prime number (p and/or q) may not be stored (e.g., for additional protection of secret information). Respectively, when a ciphertext c is received (block 460), the processing device may access stored Seed, Hint (and, optionally, $i_{max}$) and generate the set $\{X_j\}$ using PRF( ). Based on the generated set $\{X_j\}$, the processing device can recover, applying the n-product to the set $\{X_j\}$ (or $j_{max}$-product, if $j_{max} > n$) to recover the prime number (block 470) and decrypt the encrypted message (block 480), e.g., to obtain decrypted message 124, see FIG. 1. A similar process may be used to reproduce other prime numbers of the cryptographic key, such as q (and/or any additional prime numbers as may be used by the decryption algorithm). For example, to reproduce multiple prime numbers, e.g., p and q, a single Seed and multiple hints may be stored, e.g., $\text{Hint}_1$, $\text{Hint}_2 \ldots$. In some implementations, a single Seed and a single hint, e.g., $\text{Hint}_1$, may be stored whereas other hints $\text{Hint}_2 \ldots$ may be deterministically determined based on $\text{Hint}_1$. In some implementations, as depicted by solid arrows in FIG. 4, the generated prime numbers may be stored directly (block 440) and used for decryption of a received ciphertext (block 480).

Figure 5:
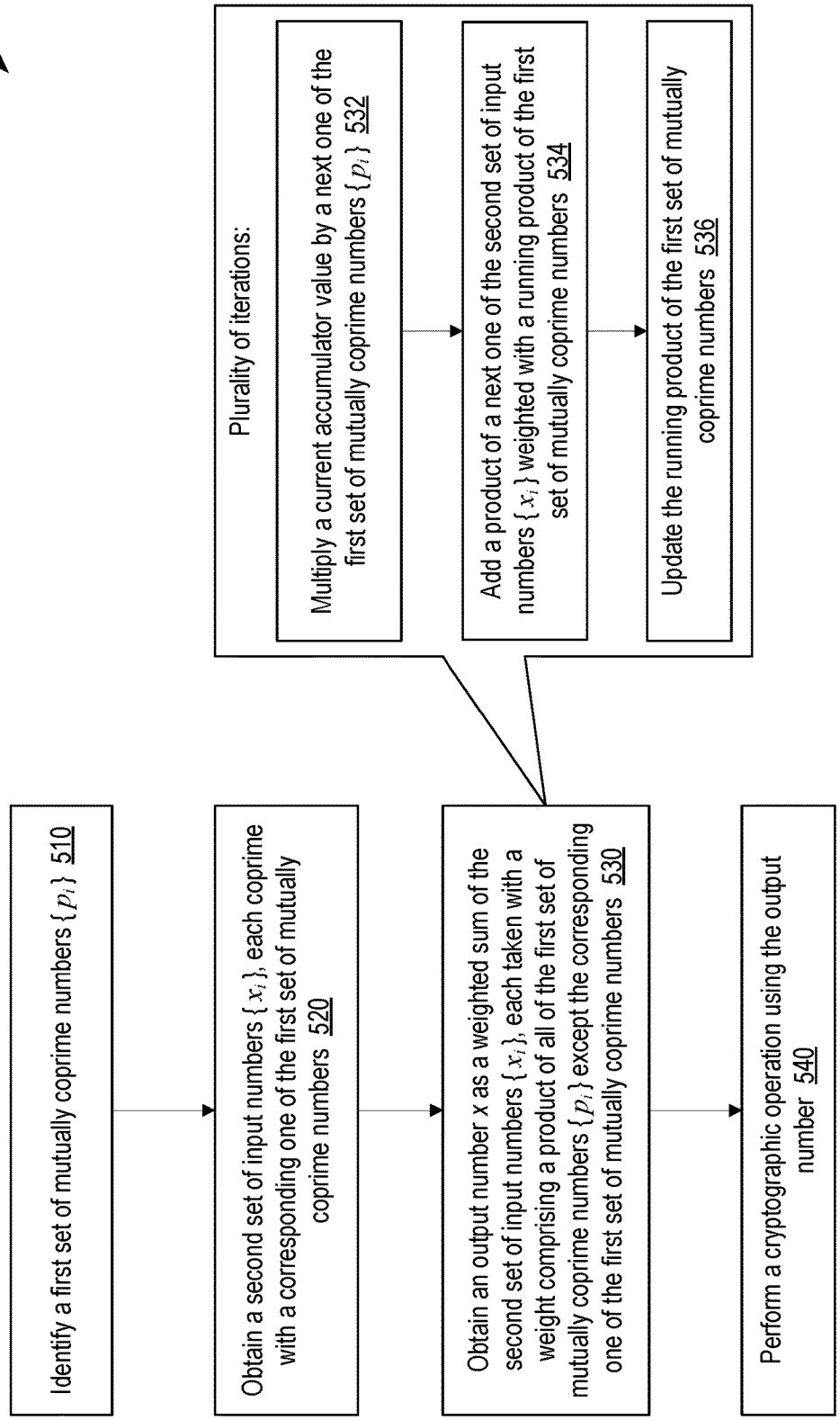
FIG. 5 depicts a flow diagram of an example of method of efficient generation of coprime numbers that avoids computation or storage of inverse values, in accordance with one or more aspects of the present disclosure.

FIG. 5 depicts a flow diagram of an example of method 500 of efficient generation of coprime numbers that avoids computation or storage of inverse values, in accordance with one or more aspects of the present disclosure. Method 500, as well as methods 600 and 700 disclosed below, and/or each of their individual functions, routines, subroutines, or operations may be performed by one or more processing units of the computing system implementing the methods, e.g., the processor 320 (or an arithmetic logic unit, an FPGA, and the like, or any processing logic, hardware or software or a combination thereof) performing a cryptographic operation, which may be based on a private key that includes a first prime number (q) and a second prime number (p). In certain implementations, each of methods 500, 600, and 700 may be performed by a single processing thread. Alternatively, each of methods 500, 600, and 700 may be performed by two or more processing threads, each thread executing one or more individual functions, routines, subroutines, or operations of the method. In an illustrative example, the processing threads implementing each of methods 500, 600, and 700 may be synchronized (e.g., using semaphores, critical sections, and/or other thread synchronization mechanisms). Alternatively, the processing threads implementing each of methods 500, 600, and 700 may be executed asynchronously with respect to each other. Various operations of each of methods 500, 600, and 700 may be performed in a different order compared to the order shown in FIGS. 5, 6, and 7. Some blocks may be performed concurrently with other blocks. Some blocks may be optional. Some or all of the blocks of each of methods 500, 600, and 700 may be performed by fast coprime and prime number generation 104 module.

Method 500 may involve identifying, at block 510, by a processing device (e.g., processor 320), a first set of mutually coprime numbers (e.g., $\{p_i\}$). In some implementations, each of the first set of mutually coprime numbers may be a prime number. At block 520, method 500 may continue with the processing device obtaining a second set of input numbers (e.g., $\{x_i\}$). Each of the second set of input numbers (e.g., $x_j$) may be coprime with a corresponding one (e.g., $p_j$) of the first set of mutually coprime numbers.

At block 530, method 500 may continue with the processing device obtaining an output number (e.g., x) that is a weighted sum of the second set of input numbers (e.g., $x_j$), each of the second set of input numbers taken with a weight that includes a product (e.g., $p_1 \cdot \ldots \cdot p_{j-1} \cdot p_{j+1} \cdot \ldots \cdot p_M$) of all of the first set of mutually coprime numbers except the corresponding one (e.g., $p_j$), of the first set of mutually coprime numbers. In some implementations, the weight may include other additional factors. In some implementations, the weight may be equal to the product $p_1 \cdot \ldots \cdot p_{j-1} \cdot p_{j+1} \cdot \ldots \cdot p_M$ and include no additional factors. In some implementations, the weighted sum of the second set of input numbers may be computed modulo a product of all of the first set of mutually coprime numbers $\Pi_M$. In some implementations, block 530 may include a number of operations shown as a blowout section of FIG. 5. Specifically, at block 532, the processing device may obtain the output number using a plurality of iterations; each of the plurality of iterations (e.g., enumerated with index j) may include updating an accumulator value (e.g., $y_j$), which may include multiplying the current accumulator value (e.g., $y_{j-1}$) by a next one (e.g., $p_j$) of the first set of mutually coprime numbers. Updating the accumulator value further include adding, at block 534, to the multiplied current accumulator value (e.g., $p_j \cdot y_{j-1}$), a product of a next one of the second set of input numbers (e.g., $x_j$) weighted with a running product (e.g., $\Pi_{j-1}$) of the first set of mutually coprime numbers. Additionally, at block 536, the processing device can update, during each of the plurality of iterations, the running product of the first set of mutually coprime numbers by multiplying the running product by the next one of the first set of mutually coprime numbers (e.g., $\Pi_1 = p_j \cdot \Pi_{j-1}$). In some implementations, each of the plurality of iterations may also include reducing the updated accumulator value modulo the updated running product (e.g., $\Pi_1$). In some implementations, instead of reducing the accumulator value at each iteration, the processing device may perform reduction of the accumulator value modulo a product of all of the first set of mutually coprime numbers (e.g., $\Pi_M$), after completion of the plurality of iterations. In some implementations, some or all modular reduction operations may include performing one or more Montgomery multiplication operations. The process of obtaining the output number, as represented by blocks 510-530 (and blocks 532-536) may be performed without computing or loading, from a memory, a modular inverse number (e.g., $(\Pi_M/p_i)^{-1} \mod p_i$).

At block 540, method 500 may continue with the processing device using the output number (e.g., x) to perform one or more cryptographic operations. For example, the processing device may verify that the output number is a prime number and use the output number to generate a public/private key pair, transmit the public key to a sender of a message, receive the message encrypted using the public key, and decrypt it with the private key. In some implementations, instead of storing the private (and/or the public) key, the processing device can store the output number for recovering the private (and/or the public) key at a later time, when the decryption is to be performed. In some implementations, the output number may be a non-prime number, but a number that may be used in generating (e.g., by method 600 or other methods) other numbers that may be prime numbers.

Figure 6:
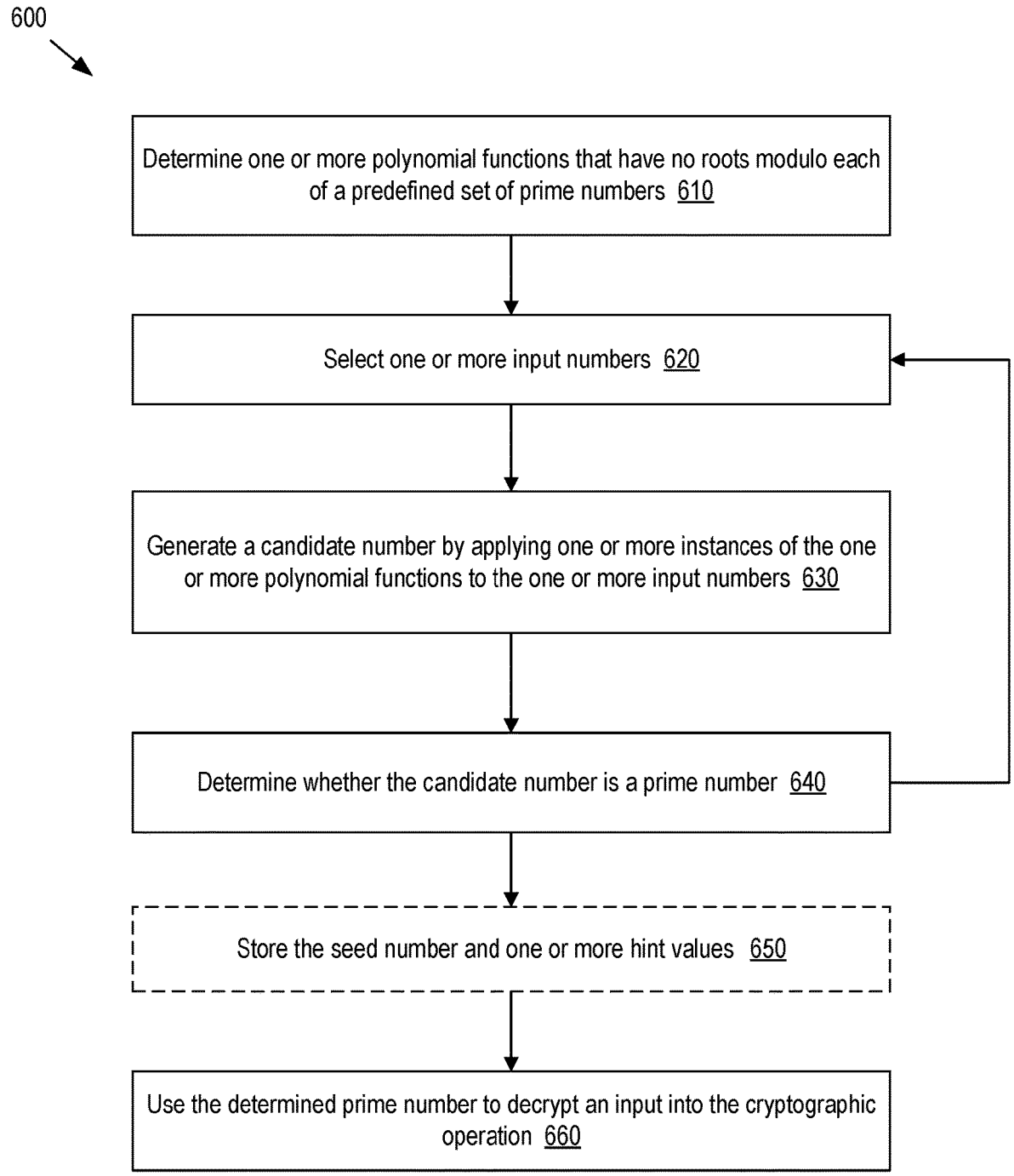
FIG. 6 depicts a flow diagram of an example method of generating and using prime numbers in cryptographic applications, in accordance with one or more aspects of the present disclosure.

FIG. 6 depicts a flow diagram of an example method 600 of generating and using prime numbers in cryptographic applications, in accordance with one or more aspects of the present disclosure. Method 600 may be implemented by processor 320 (or an arithmetic logic unit, an FPGA, and the like, or any processing logic, hardware or software or a combination thereof) performing a cryptographic operation, which may be set up to use a private key comprising two or more prime numbers, e.g., p and q. Method 600 may involve receiving an encrypted message c (ciphertext) from sending device 110. Prime numbers may be generated when the cryptographic application is set up and/or at regular time intervals, when the previous key has become compromised as a result of a power-analysis attack, a security breach, and so on. In some implementations, the private key may include three or more prime numbers.

The processing device implementing method 600 may initiate generation of a new set of prime numbers as part of a new cryptographic key. At block 610, the processing device may determine one or more polynomial functions that have no roots modulo each of a predefined set of prime numbers $\{P_i\}$, which may be a set of the lowest prime numbers up to a certain target prime number (e.g., the first N prime numbers excluding number 2). The processing device may select one or more parameter values (e.g., $-u$, $-u_1$, $-u_2$ . . . ) that are quadratic non-residues modulo each of the predefined set of prime numbers and use the selected parameter values to construct the one or more polynomial functions, e.g., $X^2 + u$. In some implementations, the one or more polynomial functions can be quadratic functions, e.g., $G(X) = s \cdot X^2 + t \cdot X + u$, whose discriminant $t^2 - 4s \cdot u \neq 0$ is a quadratic nonresidue modulo each of the predefined set of prime numbers.

At block 620, method 600 may continue with selecting one or more input numbers $\{X_j\}$. In some implementations, the input numbers may be selected randomly within a predetermined interval. In some implementations, the input numbers may be selected using a respective (different for each j) output of a pseudorandom function. The respective j-th output of the pseudorandom function may determined in view of a seed number Seed and a respective hint value $\text{Hint}_j$. The seed number may be common to all instances j of selection of the input numbers $X_j$ whereas the hint numbers may be different for different j. In some implementations, both the hint number and the seed number change with every j when a new number $X_j$ is being selected.

At block 630, method 600 may continue with the processing device generating a candidate number Z by applying one or more instances of the one or more polynomial functions to the one or more input numbers. The candidate number Z may be generated by determining a product of multiple instances of the polynomial function, e.g., $Z = (X_1^2 + u) \cdot (X_2^2 + u) \cdot \ldots$ . In some implementations, all instances j involve the same polynomial function $F(X_j, u)$ whereas in other implementations, some of the instances j may involve a different polynomial function $G(X_j, u)$ that is based on the same parameter value $-u$, or the same polynomial function $F(X_j, u_1), F(X_j, u_2) \ldots$ that is based on different values $-u_1$, $-u_2 \ldots$, or different polynomial functions $G(X_j, u_1), H(X_j, u_2) \ldots$ that are based on different values $-u_1, -u_2 \ldots$, and so on. In some implementations, the product of the instances of the polynomial function is determined modulo a modulus number. The modulus number may be divisible by each of the predefined set of prime numbers $\{P_i\}$, e.g., the modulus number may be a product of the predefined set of prime numbers, $\Pi_i P_i$ (but may also include additional factors). The number of instances $j_{max}$ of polynomial function(s) may be arbitrary, e.g., in some implementations, the number of instances may be four, five, or more. In some implementations, the product of each of the one or more instances of the polynomial function(s) may be determined using Montgomery multiplication techniques.

At block 640, method 600 may continue with the processing device determining, using any known methods, that the candidate number Z is a prime number. Responsive to such a determination, the processing device may store, at block 650, the seed number Seed and the one or more hint values $\text{Hint}_j$, which resulted in generation of a successful candidate number Z. In some implementations, the determined prime numbers, e.g., p and q, may be used to generate the product $p \cdot q$ that is published (or transmitted) as part of the public key, whereas the values p and q may not be stored.

In some instances, the successful candidate number Z may not be the first candidate number generated using the set of input numbers $\{X_j\}$. For example, the set of initial input numbers $\{X_j\}$ may first be used to generate an initial (unsuccessful) candidate number using initial instances of the polynomial function(s) as described above, e.g., by multiplying the product of each of the one or more initial instances of the polynomial function(s). Accordingly, once it is determined that the initial candidate number is not a prime number, the product of the initial instances of the polynomial function(s) may be multiplied by one or more additional instances of the polynomial function (as applied to one or more additional input numbers $X_j$).

At block 660, method 600 may continue with the processing device using the determined prime number to decrypt an input into the cryptographic operation. For example, the processing device may receive the (ciphertext) input c and decrypt c to obtain message m. The decryption operation may be performed using the previously determined prime number(s), e.g., p and q, by computing (recovering) the determined prime number(s) using the stored seed number Seed and the one or more hint values $Hint_j$.

Figure 7:
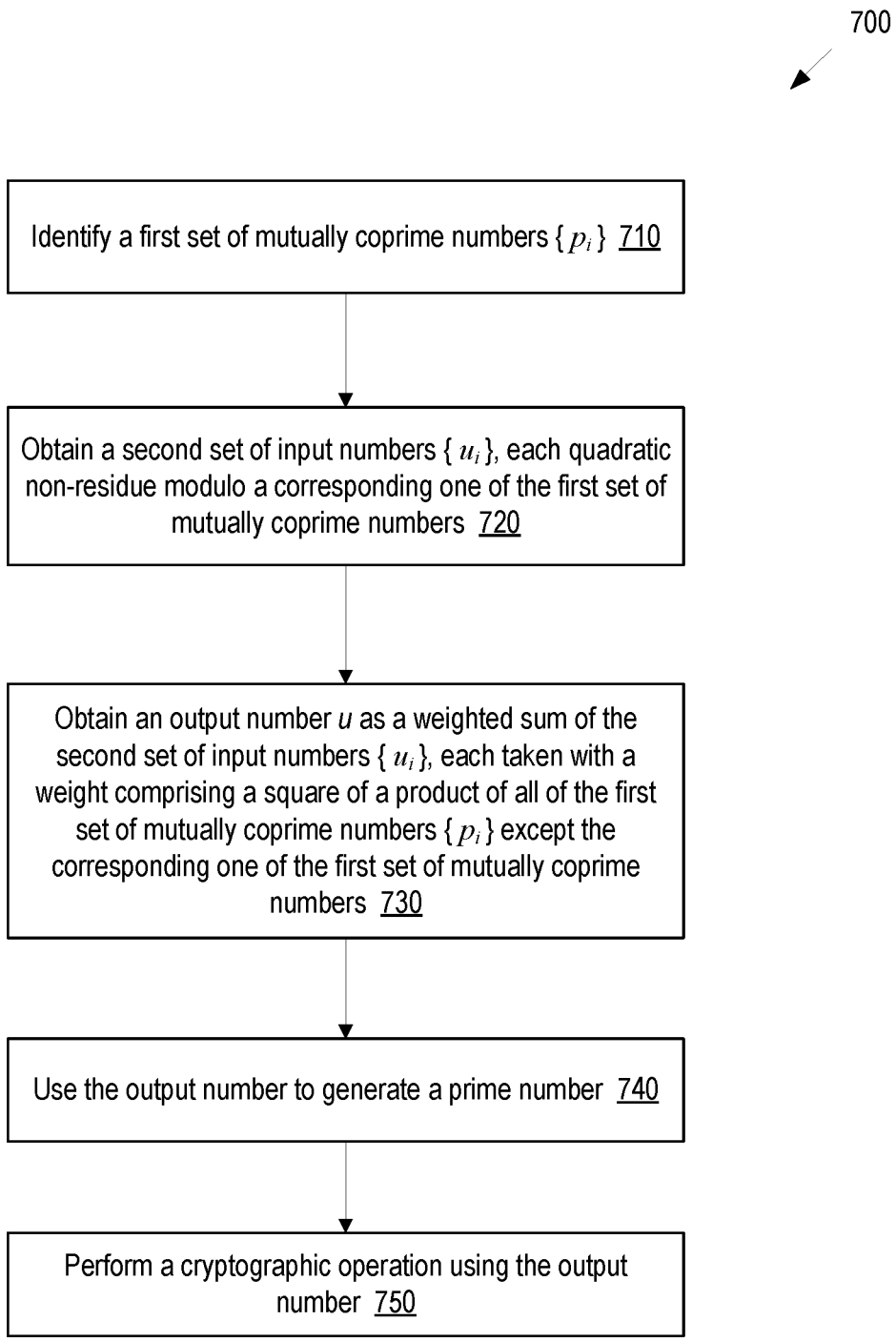
FIG. 7 depicts a flow diagram of an example method of generating nonresidue numbers for use in cryptographic applications, in accordance with one or more aspects of the present disclosure.

FIG. 7 depicts a flow diagram of an example method 700 of generating nonresidue numbers for use in cryptographic applications, in accordance with one or more aspects of the present disclosure. Method 700 may involve identifying, at block 710, by a processing device (e.g., processor 320), a first set of mutually coprime numbers (e.g., $\{p_i\}$). In some implementations, each of the first set of mutually coprime numbers may be a prime number. At block 720, method 700 may continue with the processing device obtaining a second set of input numbers (e.g., $\{u_1\}$). Each of the second set of input numbers (e.g., $x_j$) may be a quadratic nonresidue modulo a corresponding one (e.g., $p_j$) of the first set of mutually coprime numbers.

At block 730, method 500 may continue with the processing device obtaining an output number (e.g., x) that is a weighted sum of the second set of input numbers (e.g., $x_j$), each of the second set of input numbers taken with a weight that includes a square of a product (e.g., $p_1 \cdot \ldots \cdot p_{j-1} \cdot p_{j+1} \cdot \ldots \cdot p_M$) of all of the first set of mutually coprime numbers except the corresponding one (e.g., $p_j$), of the first set of mutually coprime numbers. In some implementations, the weight may include other additional factors. In some implementations, the weight may be equal to the square of the product $p_1 \cdot \ldots \cdot p_{j-1} \cdot p_{j+1} \cdot \ldots \cdot p_M$ and include no additional factors. In some implementations, the weighted sum of the second set of input numbers may be computed modulo a product of all of the first set of mutually coprime numbers $\Pi_M$.

In some implementations, block 730 may include a processing (e.g., iterative processing, computing an accumulator value, a running product value, etc.) that is similar to processing described in conjunction with the blowout section of FIG. 5, e.g., including blocks that are similar to blocks 532-536. At block 740, the output number (e.g., u) may be used to generate a prime number (e.g., using method 600 or some other method). At block 750, method 700 may continue with the processing device using the generated prime number to perform one or more cryptographic operations (e.g., similar to cryptographic operations described above in conjunction with block 540 of method 500).

Figure 8:
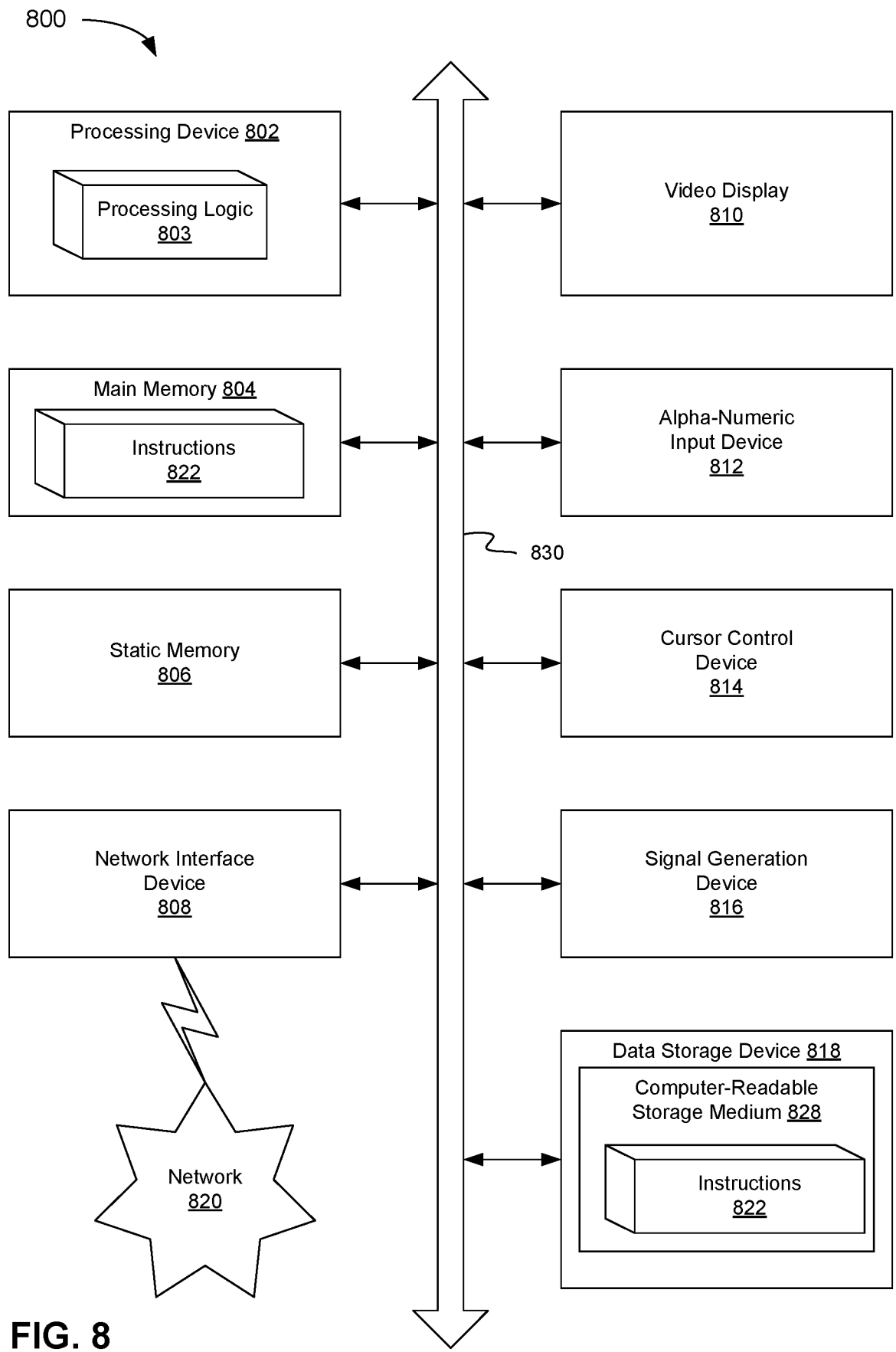
FIG. 8 depicts a block diagram of an example computer system operating in accordance with one or more aspects of the present disclosure.

FIG. 8 depicts a block diagram of an example computer system 800 operating in accordance with one or more aspects of the present disclosure. In various illustrative examples, computer system 800 may represent the computer device 302, illustrated in FIG. 3.

Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 802 (also referred to as a processor or CPU), which may include processing logic 803, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing method 500 of efficient generation of coprime numbers that avoids computation or storage of inverse values, method 600 of generating and using prime numbers in cryptographic applications, and method 700 of generating nonresidue numbers for use in cryptographic applications.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing method 500 of efficient generation of coprime numbers that avoids computation or storage of inverse values, method 600 of generating and using prime numbers in cryptographic applications, and method 700 of generating nonresidue numbers for use in cryptographic applications.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving a ciphertext that comprises a message encrypted with a public key associated with a key pair comprising the public key and a private key;
   identifying, by a processing device, a first set of mutually coprime numbers;
   obtaining, by the processing device, a second set of input numbers associated with the private key of the key pair, wherein each of the second set of input numbers is coprime with a corresponding one of the first set of mutually coprime numbers;
   obtaining, by the processing device, an output number, wherein the output number is a weighted sum of the second set of input numbers, each of the second set of input numbers taken with a weight comprising a product of all of the first set of mutually coprime numbers except the corresponding one of the first set of mutually coprime numbers;
   obtaining, by the processing device, the private key using the output number; and
   decrypting, by the processing device, the message using the ciphertext and the private key.

2. The method of claim 1, wherein each of the first set of mutually coprime numbers is a prime number.

3. The method of claim 1, wherein each of the second set of input numbers is taken with the weight that is equal to the product of all of the first set of mutually coprime numbers except the corresponding one of the first set of mutually coprime numbers.

4. The method of claim 1, wherein the weighted sum of the second set of input numbers is computed modulo a product of all of the first set of mutually coprime numbers.

5. The method of claim 1, wherein obtaining the output number comprises performing a plurality of iterations, each of the plurality of iterations comprising updating an accumulator value, wherein updating the accumulator value comprises multiplying a current accumulator value by a next one of the first set of mutually coprime numbers.

6. The method of claim 5, wherein updating the accumulator value further comprises adding, to the multiplied current accumulator value, a product of a next one of the second set of input numbers weighted with a running product of the first set of mutually coprime numbers.

7. The method of claim 6, wherein each of the plurality of iterations further comprises updating the running product of the first set of mutually coprime numbers by multiplying the running product by the next one of the first set of mutually coprime numbers.

8. The method of claim 7, wherein each of the plurality of iterations further comprises reducing the updated accumulator value modulo the updated running product.

9. The method of claim 5, wherein obtaining the output number comprises reducing, modulo a product of all of the first set of mutually coprime numbers, the accumulator value after completion of the plurality of iterations.

10. The method of claim 1, wherein obtaining the output number comprises performing one or more Montgomery multiplication operations.

11. The method of claim 1, wherein obtaining the output number is performed without computing or loading, from a memory, a modular inverse number.

12. A method comprising:
  receiving a ciphertext that comprises a message encrypted with a public key associated with a key pair comprising the public key and a private key;
  identifying, by a processing device, a first set of mutually coprime numbers;
  obtaining, by the processing device, a second set of input numbers associated with the private key of the key pair, wherein each of the second set of input numbers is quadratic non-residue modulo a corresponding one of the first set of mutually coprime numbers;
  obtaining an output number, wherein the output number is a weighted sum of the second set of input numbers, each of the second set of input numbers taken with a weight comprising a square of a product of all of the first set of mutually coprime numbers except the corresponding one of the first set of mutually coprime numbers;
  using, by the processing device, the output number to generate a prime number;
  obtaining, by the processing device, the private key using the output number; and
  decrypting, by the processing device, the message using the ciphertext and the private key.

13. The method of claim 12, wherein each of the first set of mutually coprime numbers is a prime number.

14. The method of claim 12, wherein each of the second set of input numbers is taken with the weight that is equal to the product of all of the first set of mutually coprime numbers except the corresponding one of the first set of mutually coprime numbers.

15. A system to perform a cryptographic operation, the system comprising:
  a memory device; and
  a processing device communicatively coupled to the memory device, the processing device to:
    receive a ciphertext that comprises a message encrypted with a public key associated with a key pair comprising the public key and a private key;
    identify a first set of mutually coprime numbers;
    obtain a second set of input numbers associated with the private key of the key pair, wherein each of the second set of input numbers is coprime with a corresponding one of the first set of mutually coprime numbers;
    obtain an output number, wherein the output number is a weighted sum of the second set of input numbers, each of the second set of input numbers taken with a weight comprising a product of all of the first set of mutually coprime numbers except the corresponding one of the first set of mutually coprime numbers;
    obtain the private key using the output number; and
    decrypt the message using the ciphertext and the private key.

16. The system of claim 15, wherein each of the second set of input numbers is taken with the weight that is equal to the product of all of the first set of mutually coprime numbers except the corresponding one of the first set of mutually coprime numbers.

17. The system of claim 15, wherein to obtain the output number, the processing device is to perform a plurality of iterations, each of the plurality of iterations comprising updating an accumulator value, wherein updating the accumulator value comprises multiplying a current accumulator value by a next one of the first set of mutually coprime numbers.

18. The system of claim 17, wherein updating the accumulator value further comprises adding, to the multiplied current accumulator value, a product of a next one of the second set of input numbers weighted with a running product of the first set of mutually coprime numbers.

19. The system of claim 18, wherein each of the plurality of iterations further comprises updating the running product of the first set of mutually coprime numbers by multiplying the running product by the next one of the first set of mutually coprime numbers.

20. The system of claim 17, wherein to obtain the output number, the processing device is to reduce, modulo a product of all of the first set of mutually coprime numbers, the accumulator value after completion of the plurality of iterations.

* * * * *